United States Patent [19]

Kisch

[11] 4,325,793

[45] Apr. 20, 1982

[54] CATALYSIS OF PHOTOCHEMICAL PRODUCTION OF HYDROGEN FROM WATER

[75] Inventor: Horst Kisch, Mulheim, Fed. Rep. of Germany

[73] Assignee: Studiengesellschaft Kohle m.b.H., Mulheim, Fed. Rep. of Germany

[21] Appl. No.: 266,865

[22] Filed: May 26, 1981

Related U.S. Application Data

[63] Continuation-in-part of Ser. No. 127,013, Mar. 4, 1980, abandoned.

[30] Foreign Application Priority Data

Mar. 6, 1979 [DE] Fed. Rep. of Germany ....... 2908663

[51] Int. Cl.$^3$ .............................................. B01J 19/12
[52] U.S. Cl. .......................... 204/157.1 R; 252/431 N
[58] Field of Search ................................ 204/157.1 W

[56] References Cited

U.S. PATENT DOCUMENTS 4,176,026 11/1979 Harriman et al. ........... 204/157.1 R
4,211,621 7/1980 Porter .......................... 204/157.1 R

*Primary Examiner*—Howard S. Williams
*Attorney, Agent, or Firm*—Sprung, Felfe, Horn, Lynch & Kramer

[57] ABSTRACT

The invention is a catalytic process for splitting water to provide hydrogen by irradiating an aqueous solution with actinic light. The solution contains a catalyst comprising a complex compound of a metal of the Group Ib, IIb, IVb, Vb, VIb, VIIb and VIIIb of the periodic system or magnesium, having ligands linked to the metal atom via two sulfur atoms or via one sulfur atom and one nitrogen atom.

14 Claims, No Drawings

CATALYSIS OF PHOTOCHEMICAL PRODUCTION OF HYDROGEN FROM WATER

This is a continuation-in-part of application Ser. No. 127,013, filed Mar. 4, 1980, now abandoned.

FIELD OF THE INVENTION

The present invention relates to a catalytic process for photochemical generation of hydrogen from water and to a catalyst for this process.

BACKGROUND OF THE INVENTION INCLUDING PRIOR ART

Three examples of non-enzymatic homogenous, metal-catalyzed photolysis of water are known at present in the literature. J.-M. Lehn and J.-P. Sauvage (Nouv. J. Chim. 1, 1977, 449) describe a four-component system consisting of tris ($\alpha,\alpha'$-dipyridyl) ruthenium (II) dichloride, the mild reducing agent triethanolamine, a "rhodiumbipyridyl complex" and $K_2PtCl_6$. Upon exposure to light in aqueous solution, this system produces a maximum of 4 ml $H_2$ in 1.5 hours.

H. Kagan et al. (Nouv. J. Chim. 2, 1978, 547) used a slightly modified system: tris ($\alpha,\alpha'$-dipyridyl) ruthenium (II) dichloride, ethylene diamine tetraacetic acid, methylviologen, and colloidal platinum or gold. They obtained a maximum of 10 ml of $H_2$ in roughly 10 hours.

J. Kiwi and M. Gratzel published a system almost identical to that of Kagan (Helv. Chim. Acta 61, 2720) in which the platinum or gold in Kagan's catalyst system was merely replaced by $PtO_2$ (Adams' catalyst). These authors obtained 0.4 ml of $H_2$ in 0.5 hours.

If photochemical generation of hydrogen from water is to have any practical significance, there is clearly a need to increase the rates of hydrogen production by photochemical disintegration of water.

SUMMARY OF THE INVENTION

The present invention provides a photochemical process for the catalytic splitting of water to generate hydrogen. A catalyst of the group consisting of metal complex compounds of a transition metal of the group $I_b$, $II_b$, $III_b$, $V_b$, $VI_b$, $VII_b$ and VIII of periodic system or magnesium having ligands linked to the metal atom via two sulfur atoms or via one sulfur atom and one nitrogen atom is either formed in situ, or separately formed and thereafter dissolved in a solution comprising water. The solution is irradiated with actinic light preferably in the near UV range to split the water and generate hydrogen at a relatively rapid rate.

Preferably, the metals of the complex are Ti, V, Cr, Mo, W, Mn, Re, Fe, Os, Co, Ni, Pd, Pt, Cu, Au, Zn, Cd, and Mg.

In one aspect of the invention, the ligand is linked to the metal atoms via two sulfur atoms and is a dithiolene resulting in the formula

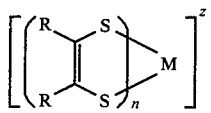
(I)

wherein
M represents the metal atom;
R is independently hydrogen, alkyl, trifluoromethyl, aryl, thioalkyl, thioaryl, or the trithiocarbonate group;
n is 2 or 3; and
z is 0, −1, or −2, representing the charge of the complex.

In another aspect of the invention the ligand is a dithiodiamide group which is linked to the metal atom via one sulfur and one nitrogen atom, resulting in the formula

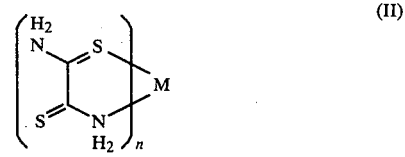
(II)

wherein
M represents the metal atom;
n is 2 or 3.

In a further aspect of the invention, the ligand is linked to the metal atom via two sulfur atoms and is a dithiocarbamate group having the formula

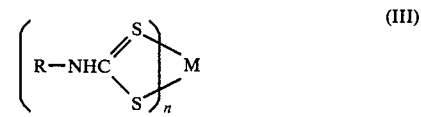
(III)

wherein
M represents the metal atom;
R is independently hydrogen, alkyl, trifluoromethyl, aryl, thioalkyl, thioaryl, or trithiocarbonate group;
n is 2 or 3.

The solution can comprise an organic solvent having preferably a boiling point below 200° C. The organic solvent can be a member of the group consisting of tetrahydrofuran, dihydrofuran and methylene chloride. The dihydrofuran is preferably 2,5 - dihydrofuran A preferred temperature range for the solution under irradiation is in a temperature range of from about 10° C. to 100° C. The actinic irradiation is preferably effected with light having a wavelength of more than about 254 nm. such as provided by a high-pressure mercury-vapor lamp or sunlight.

DETAILED DESCRIPTION OF THE INVENTION INCLUDING PREFERRED EMBODIMENTS

In accordance with the present invention sulfur containing metal complexes surprisingly form catalysts providing for photochemical production of hydrogen from water in at rates not previously obtained. Usable catalysts are complex compounds, formed from organic sulfur compounds and metal salts of metals of groups $I_b$, $II_b$, $IV_b$, $V_b$, $VII_b$ and VIII of the periodic system, as well as magnesium. In particular, organic sulfur compounds of metals such as titanium, vanadium, chromium, molybdenum, tungsten, manganese, rhenium, iron, osmium, cobalt, nickel, palladium, platinum, copper, gold, zinc, cadmium, and magnesium are appropriate catalysts. Typical catalysts in the present invention include metal dithiolenes represented by formula (I) (G. N. Schrauzer, Adv. Chem. Ser. 110, 1972, 73; J. A. McCleverty, Progr. Inorg. Chem. 10, 1968, 49, E.

Hoyer et al., PHosphor and Sulf. 7, 1979, 49), metal dithiodiamides represented by formula (II) (P. Ray and M. M. Ray, Quarterly Journ., Indian Chem. Soc. 3, 118; Chem. Zentralblatt (1926) II, 2158; H. J. Senf. Z. Chem. 10 (1970) 308), as well as metal dithiocarbamates represented by formula (III) (B. B. Kraul and K. B. Pandeya, J. Inorg. Nucl. Chem. 40, 1978, 229)

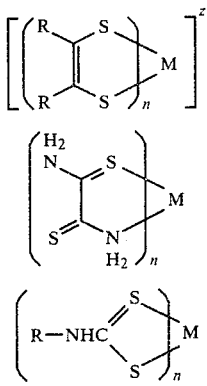

wherein

M = a metal of group IV, V, VI, VII, VIII, I and II transition and post transition metals of the periodic system, or magnesium;

R = Hydrogen, alkyl, trifluoromethyl, aryl, thioalkyl, thioaryl, or a trithiocarbonate group;

n is 2 or 3; and z is 0, −1 or −2, representing the change of the complex. Preferably the alkyl and thioalkyl group have from 1 to 20 carbon atoms and the aryl and thioaryl groups have preferably from 6 to 20 carbon atoms.

The process of the present invention is carried out preferably in a solvent. In addition to water, there can be used primarily mixtures of water with an organic solvent such as tetrahydrofuran (THF), dihydrofuran (preferably 2,5-dihydrofuran), or methylene chloride, or water with mixtures of organic solvents of this kind.

As light source, a high-pressure mercury-vapor projector (such as Philips HPK 125 W) or another lamp may be used, emitting light of the wave length of more than 254 nm. A preferred light source is sunlight.

In general the process is carried out at room temperature, but higher temperatures promote the reaction rate of the procedure according to the invention. A preferred temperature range is near the boiling temperature of the respective solvent.

The rate of hydrogen generation (conversion rate) is a function of the type of catalyst, of the nature of the ligand R and the type of central metal. Dithiolene and dithiooxamide complexes of iron and nickel possess greater catalytic activity than cobalt or palladium compounds. Magnesium, as central metal, also possesses and considerable catalytic effectiveness. The maximum conversion rates amount to up to several thousand moles $H_2$/mole catalyst.

The procedure according to the invention permits for the first time the catalytic photochemical production of larger amounts of hydrogen from water, by means of simple metal catalyst. Hydrogen has been used as an energy carrier, in lieu of mineral oils or fossil fuels, and can be widely applied as a reducing agent in chemical processes.

The examples cited below represent preferred embodiments of the invention and are not to be construed as limiting the scope of the invention.

EXAMPLES 1–14

The metal-catalyzed photochemical generation of hydrogen from water was performed using the following metal catalysts:

1—Diethylammonium-tris (tolyl-3,4-dithiolato) titanate (2-)
2—Tris (cis-stilbene-1,2-dithiolato) molybdenum
3—Tetrabutylammonium-tris [(cis-1,2-dicyanoethylene-1,2-dithiolato]-S,S) tungstenate (2-)
4—Bis (cis-stilbene-1,2-dithiolato) iron
5—Bis (cis-stilbene-1,2-dithiolato) nickel
6—Tetrabutylammonium-bis (cis-stilbene-1,2-dithiolato) niccolate (1-)
7—Bis (cis-2-butene-2,3-dithiolato) nickel
8—Tetrabutylammonium-bis (ethylene-cis-1,2-dithiolato) niccolate (1-)
9—Tetrabutylammonium-bis [(cis-1,2-dicyanoethylene-1,2-dithiolato)-S-S] niccolate (2-)
10—Tris (dithiodiamido) dinickel
11—Bis (benzene-1,2-diiminato) nickel
12—(2,2'-bipyridine) (cis-stilbene-1,2-dithiolato) nickel
13—Bis (cis-stilbene-1,2-dithiolato) platinum
14—Tetrabutylammonium-bis [(cis-1,2-dicyanoethylene-1,2-dithiolato)-S-S] zincate (2-)

The formula representations of the complexes present in Examples 1 to 14 are as follows:

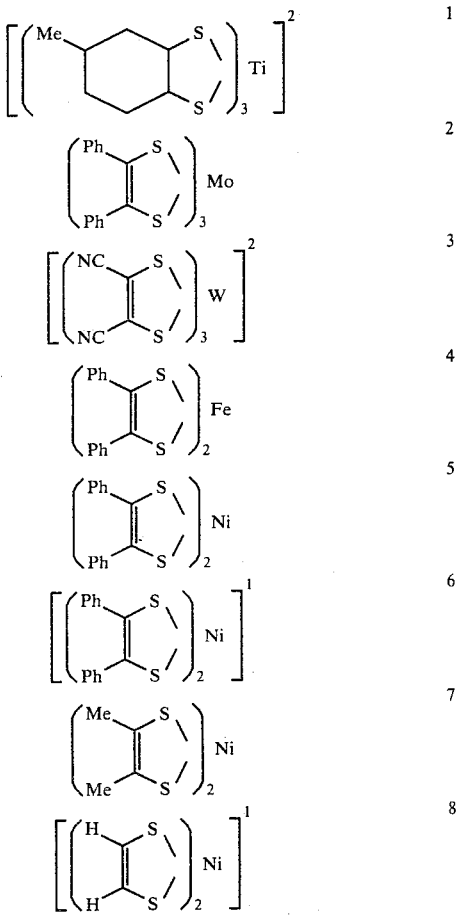

-continued

9
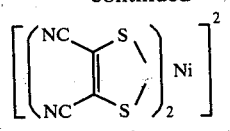

10
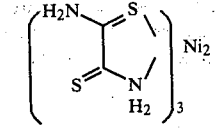

11
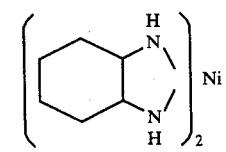

12
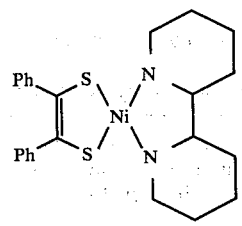

13
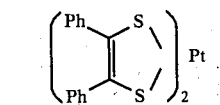

14
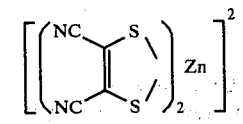

The millimoles of the metal catalyst employed are listed in Table I and were dissoled in 150 ml of a solvent mixture of tetrahydrofuran and water, mixing ratio 2:1, by volume. The resulting solution was exposed to light for 20 hours in a submerged light apparatus with a quartz inner shaft in which a Philips HPK 125 watt light had been introduced.

Table I shows that a specific amount of millimoles of hydrogen was developed and this amount was used to calculate the conversion rates listed in the last column of Table I. In similar examples not listed total amounts of several liters of hydrogen were produced.

TABLE I

| No. | Catalyst Complex type, Millimole | M,R,n,z | Milli-mole $H_2$ | Conversion Rate (mMoles $H_2$/ millimoles Catalysts/hr) |
|---|---|---|---|---|
| 1 | 1, 0.08 | Ti, m-CH$_3$C$_6$H$_6$, 3,−2 | 2.6 | 1.9 |
| 2 | 1, 0.021 | Mo, Ph, 3,0 | 1.81 | 4.3 |
| 3 | 1, 0.089 | W, CN, 3,−2 | 3.47 | 1.9 |
| 4 | 1, 0.023 | Fe, Ph, 2,0 | 2.15 | 4.7 |
| 5 | 1, 0.021 | Ni, Ph, 2,0 | 1.18 | 2.8 |
| 6 | 1, 0.022 | Ni, Ph, 2,−1 | 1.36 | 3.1 |
| 7 | 1, 0.022 | Ni, Me, 2,0 | 2.52 | 5.7 |
| 8 | 1, 0.022 | Ni, H, 2,−1 | 2.72 | 6.3 |
| 9 | 1, 0.021 | Ni, CN, 2,−2 | 2.13 | 5.1 |
| 10 | 2, 0.02 | Ni | 2.96 | 7.4 |
| 11 | 2, 0.2 | Ni | 1.26 | 7.0 |
| 12 | 1, 0.085 | Ni | 1.48 | 0.9 |
| 13 | 1, 0.02 | Pt, Ph, 2,0 | 1.87 | 4.7 |
| 14 | 1, 0.12 | Zn, CN, 2,−2 | 11.1 | 4.6 |

EXAMPLE 16

99 mg. (0.12 mMole) of the bis-(tetrabutylammonium)zinc dithiolene of a composition represented by Formula (I) (R=CN, n=2, z=−2) was dissolved in a solvent consisting of a tetrahydrofuran deuterium oxide mixture in a 1:1 volume ratio, and was filled into a submerged light apparatus (Lamp: Philips HPX 125 W) made of glass. The solution was rinsed with argon for 30 minutes and was then exposed to light for 96 hours. This produced 150 ml (6.7 mMole) of hydrogen (conversion rate in mMoles $H_2$/moles catalysts=56). Mass spectrographic gas analysis indicated a ratio of $D_2$:HD:$H_2$=10:1:0.

EXAMPLE 17

The procedure was the same in Example 16, except that 55 mg (0.09 mMoles) of the bis-(tetramethylammonium) zinc dithiolene of formula (I) (R-R=SCS$_2$, N-2,z=−2) and 2,5-dihydrofuran/$H_2$O=1/1 were used. In 24 hours, 515 ml of hydrogen were produced (conversion rate=255).

EXAMPLE 18

The procedure was the same as in Example 16, except that the light-exposure was carried out in a submerged-light apparatus with a quartz inner shaft. In 12 hours, 170 ml of hydrogen were produced; $D_2$:HD:$H_2$=6:1:0.

EXAMPLE 19

The procedure was the same as in Example 18, except that 50 mg (0.06 mMoles) of zinc dithiolene and 2,5-dihydrofuran $D_2O$=1/1 were employed. In 24 hours 2.153 liters of hydrogen were produced (conversion rate=1600); $D_2$:HD:$H_2$=3.6:1:0.14. An improved result is found, if a homogenous solvent mixture of 2,5-dihydrofuran/$H_2$O/tetrahydrofuran=1:1:1 by volume is used.

EXAMPLE 20

The procedure was the same as in Example 18, except that the tetrahydrofuran/water volume ration was 2:1; 12.5 mg (0.023 mMoles) of iron dithiolene of formula (I) (R=Ph, 2.0) were employed and in 67 hours, 100.5 ml (4.48 millimoles) of hydrogen were obtained (conversion rate=195).

EXAMPLE 21

The procedure was the same as in Example 18, except 1 gram (1.8 mMole) of nickel dithiolene of formula (I) (R=Ph, 2.0); in 66 hours, 425 ml (18.97 millimiles) of hydrogen were obtained (conversion rate=10).

EXAMPLE 22

An amount of 32 mg (0.0386 moles) of (Bu$_4$N)$_2$C$_2$S$_2$(CN)$_2$Zn (14) was dissolved in a mixture of 40 ml of tetrahydrofuran and 20 ml of water and was exposed in daylight in a quartz test tube with a rubber gasket and a screw cap for ten days in the city of Mulheim-Ruhr, Feb. 4–15, 1979. Gas chromatographic $H_2$ determination indicated generation of 0.02 ml of hydrogen.

Some improvement in conversion rate has been found when the catalyst itself is formed in situ rather than separately, as illustrated in the following examples.

EXAMPLE 23

The procedure followed was as in Example 19, but using dihydrofuran/water=1:1, 37.6 mg (0.2 mmoles) disodium-cis-1,2-dicyanoethylene-1,2-dithiolate and 13.6 mg (0.1 mmoles) $ZnCl_2$ to form the catalyst complex in situ. In 20 hours 2.8 liters hydrogen were formed (conversion rate=1250).

EXAMPLE 24

The procedure followed was as in Example 23, but using 75 mg (0.4 mmoles) disodium-cis-1,2-dicyanoethylene-1,2-dithiolate and 19 mg (0.2 mmoles) $MgCl_2$ to form the catalyst complex in situ. In 3 days 1 liter of hydrogen is formed.

What is claimed is:

1. Process for the catalytic splitting of water to provide hydrogen, comprising irradiating with actinic light an aqueous solution containing a catalyst comprising a complex compound of a metal of the group $I_b$, $II_b$, $IV_b$, $V_b$, $VI_b$, $VII_b$ and VIII of the periodic system or magnesium, having ligands linked to the metal atom via two sulfur atoms or via one sulfur atom and one nitrogen atom, thereby to split the water and form hydrogen.

2. The process according to claim 1, in which said metal is a transition metal from group $IV_b$, $V_b$, $VI_b$ and $VII_b$ of the periodic system.

3. The process according to claim 1, wherein the metal is iron or nickel.

4. The process according to claim 1, wherein the metal is magnesium or zinc.

5. The process according to claim 4, wherein the organic solvent is a member of the group consisting of tetrahydrofuran, dihydrofuran and methylene chloride.

6. The process according to claim 5, wherein the dihydrofuran is 2,5 dihydrofuran.

7. The process according to claim 1, wherein the ligand linked to the metal atoms via two sulfur atoms is a metal dithiolene resulting in the formula

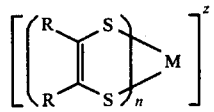

wherein
M represents the metal atom;
R is independently hydrogen, alkyl, trifluoromethyl, aryl, thioalkyl, thioaryl or a trithiocarbonate group;
n is 2, 3; and
z is 0, −1, or −2, representing the charge of the complex.

8. The process according to claim 1, wherein the ligand linked to the metal atom via one sulfur atom and one nitrogen atom is a group resulting in the formula

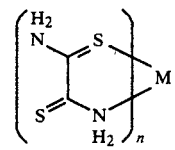

wherein
M represents the metal atom; and
n is 2 or 3.

9. The process according to claim 8, wherein the irradiating photons are provided by sunlight.

10. The process according to claim 1, wherein the ligand linked to the metal atom via two sulfur atoms is a dithiocarbamate group resulting in the formula

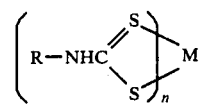

wherein
M represents the metal atom;
R is independently hydrogen, alkyl, thiofluoromethyl, aryl, thioalkyl, thioaryl or a trithiocarbonate; and
n is 3 or 3.

11. The process according to claim 1, wherein the solution comprises an organic solvent having a boiling point below 200° C.

12. The process according to claim 1, wherein the solution is at a temperature of from about 10° C. to 100° C.

13. The process according to claim 1, wherein the irradiating photons include photons corresponding to a light with a wavelength of more than about 254 nm.

14. Process according to claim 1, further comprising the step of forming the catalyst in an aqueous medium to form the aqueous solution.

* * * * *